W. M. JEFFREYS & W. H. CREAHEN.
TIME INDICATOR.
APPLICATION FILED MAY 17, 1912.
1,131,244.
Patented Mar. 9, 1915.
2 SHEETS—SHEET 1.
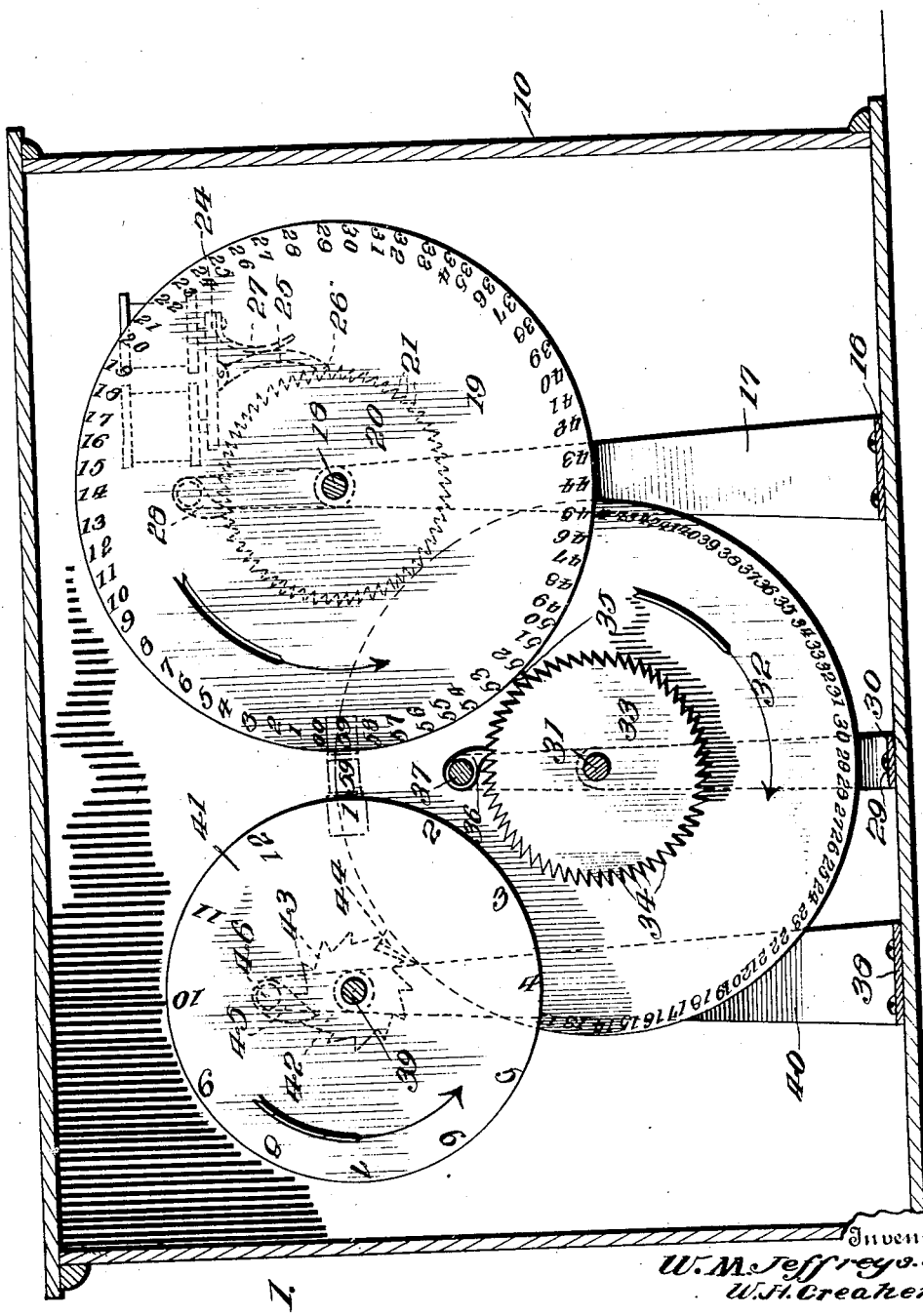

W. M. JEFFREYS & W. H. CREAHEN.
TIME INDICATOR.
APPLICATION FILED MAY 17, 1912.
1,131,244.
Patented Mar. 9, 1915.
2 SHEETS—SHEET 2.
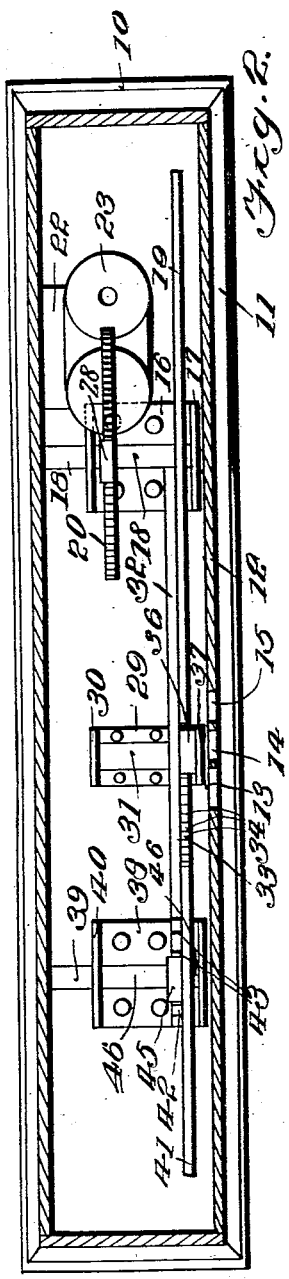
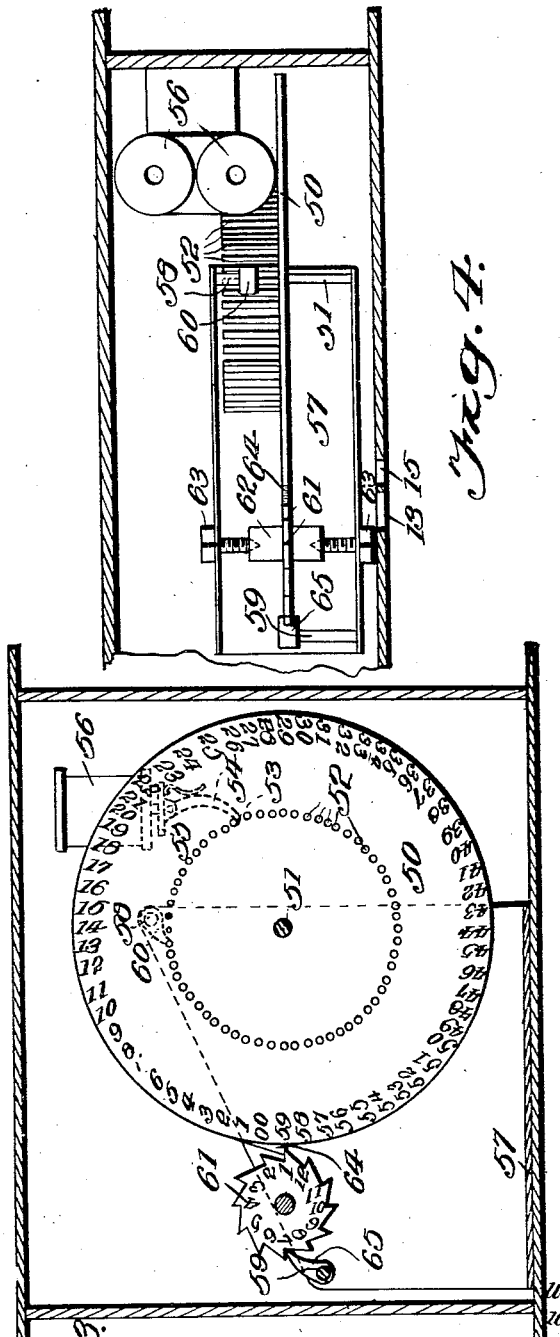

UNITED STATES PATENT OFFICE.

WILLIAM M. JEFFREYS AND WILLIAM H. CREAHEN, OF YOUNGSTOWN, OHIO, ASSIGNORS OF ONE-HALF TO HARRY W. KERR AND DENNIS T. MURRAY, OF YOUNGSTOWN, OHIO.

TIME-INDICATOR.

1,131,244.       Specification of Letters Patent.     Patented Mar. 9, 1915.

Application filed May 17, 1912. Serial No. 697,984.

*To all whom it may concern:*

Be it known that we, WILLIAM M. JEFFREYS and WILLIAM H. CREAHEN, citizens of the United States, residing at Youngstown, in the county of Mahoning and State of Ohio, have invented certain new and useful Improvements in Time-Indicators, of which the following is a specification.

Our invention relates to new and useful improvements in time indicators and more particularly to electrical time indicators, and the object of our invention is to construct an indicator which may be actuated by a current in circuit with the indicator and with a clock arranged to intermittently open and close the circuit.

A further object of our invention is to provide a time indicator having a plurality of dial disks, upon which are printed the hours and minutes, or the hours, minutes and seconds, these disks being so positioned and arranged as to, at all times, give the same reading as the master clock. And a still further object of our invention is to provide an electro-magnet, and means operable by the energizing of the magnet for revolving one of the disks, the other disk or disks being driven by the magnet operated disk.

With these and other objects in view, our invention will be more fully described, illustrated in the accompanying drawings, and then specifically pointed out in the claim which is attached to and forms a part of this application.

In the drawings: Figure 1 is a front elevation of the indicator mechanism, the casing being shown in section; Fig. 2 is a top plan view of the same, the casing being shown in section; Fig. 3 is a view similar to Fig. 1, but showing a somewhat modified form of construction; Fig. 4 is a fragmentary plan view of the mechanism shown in Fig. 3, the casing in this figure also being shown in section.

Corresponding and like parts are referred to in the following description and indicated in all the views of the drawings by the same reference characters.

The preferred embodiment of our invention includes a dial disk for indicating the seconds, another dial disk for indicating the minutes, and a third dial disk for indicating the hours, all of these disks being mounted for rotation in a suitable casing and actuated primarily by an electro-magnet which is intermittently energized through a circuit controlled by a master clock.

Referring more particularly to the drawings, 10 designates the casing, including a base 11, and a face plate 12 provided with alined openings 13, 14 and 15. This casing may be constructed of wood or metal as preferred and of suitable size, the size depending upon the size of the dial disks, which of course, must be large enough to carry the numerals or factors which, together indicate the time.

Secured to the inner face of the base 11, is a U-shaped bracket 16 having upwardly directed, spaced apart arms 17 and journaled in these arms intermediate their length, is a transversely extending shaft 18 upon which is mounted a dial disk 19, preferably of metal, and a ratchet gear 20, both the disk and gear being mounted to rotate with the shaft. This dial disk 19 indicates the seconds, as will be hereinafter explained, and is positioned adjacent the front of the casing in such a manner that its peripheral edge portion lies immediately behind the opening 15 in the face of the casing. The peripheral edge portion of this disk is marked with numerals running from zero-zero to fifty-nine, arranged in such a manner that a counterclockwise rotation of the disk will successively display the numerals through the opening 15. The ratchet wheel 20 is provided with sixty equally spaced teeth 21, each tooth corresponding to one of the numerals of the disk.

Extending from the rear wall of the casing, is a bracket 22 carrying an electro-magnet 23 having a vertically movable armature 24 normally supported in spaced relation below its poles. Pivoted in the center of this armature, is an arm 25, the free end of which is formed with a hooked terminal 26 adapted for engagement with the teeth of the ratchet wheel, this arm being preferably maintained in engagement with the ratchet wheel by a light leaf spring 27. The armature of the magnet is supported at such a distance below the magnet that its upward movement is equal to the pitch of the ratchet gear 20. It will therefore be apparent that each time the magnet is energized, the dial disk 19 will be rotated to bring the next numeral into view through the opening 15 of the casing.

In order to prevent counterrotation of the shaft 18, we have provided the upper terminal of the rear arm 17 of the bracket 16 with an inwardly directed pivot pin or stud at its upper end, upon which is pivoted a pawl 28 which engages with the teeth of the ratchet wheel.

Secured to the central portion of the base of the casing, is a bracket 29 having spaced arms 30 between which is journaled a shaft 31 carrying a second dial disk 32, this dial disk being positioned upon the shaft to lie immediately at the rear of the dial disk 19. This second dial disk constitutes the minute indicating mechanism of the device, and is consequently provided about its peripheral edge portion with numerals running from zero-zero to fifty-nine in the same manner as the numerals behind the seconds disk, said disk 32 being so mounted as to display its numerals through the opening 14 of the casing, which opening is positioned immediately to the left of the opening 15.

As a means for actuating the dial disk 32, we have provided a ratchet gear 33 which is keyed upon the shaft 31 immediately in advance of the disk 32, in the same plane with the disk 19 and substantially tangential thereto. This ratchet gear 33 is provided with sixty spaced teeth 34, each corresponding to a numeral upon the dial disk 32 and is actuated by a single tooth 35 formed upon the peripheral edge of the dial disk 19 in such a position as to engage with a tooth of the ratchet wheel 33 when the numeral 59 of the dial disk 19 passes the opening 15. The dial disk 32 is held against counter-rotation by a pawl 36 pivoted upon a stud 37 extending from the forward arm 30 of the bracket 29.

Still another bracket 38 is secured to the base 11 and a shaft 39 journaled between the arms 40 of this bracket carries a third dial disk 41 which lies in a plane with the dial disk 19 and the peripheral edge portion of which is provided with numerals from 1 to 12 indicating the hours, this disk being so positioned as to display the numerals through the opening 13 immediately to the left of the opening 14. This latter dial disk is actuated by a ratchet gear 42 secured upon the shaft 39 and having twelve teeth 43 corresponding to the numerals upon the disk. This ratchet gear 42 lies in the same plane with the dial disk 32 and tangential thereto and is actuated by a single tooth 44 formed upon the peripheral edge of the dial disk 32 at such a point as to engage with one of the teeth of the ratchet gear 42 as the numeral 59 of the dial disk 32 moves away from the opening 14. A pawl 45 is mounted upon a pivot pin 46 which extends inwardly from the rear arm of the bracket 40 and above the shaft 39. This pawl engages the teeth of the ratchet gear 42 to prevent counter-rotation of the gear.

From the foregoing description, the operation of our time indicating device will be readily understood. The device above described is intended to be actuated and controlled by a clock electrically connected in circuit with the magnet 23 and arranged to close the circuit once each second. Upon each energization of the magnet, the shaft 18 and consequently the dial disk 19 is rotated to approximately an angle of six degrees to bring the next seconds numeral into position behind the opening 15, the device being set in such a manner that the numeral displayed behind this opening corresponds to the position of the second hand of the clock.

As will be readily seen during each complete revolution of the dial disk 19, its tooth 35 will engage the ratchet gear 34 to turn the dial disk 32 to substantially six degrees to bring the next numeral of said disk into position beneath the opening 14. In like manner, each complete revolution of the dial disk 32 will revolve the dial disk 41 to an angle of substantially 30 degrees to bring its next numeral into position behind the opening 13. It will of course be understood that the dial disk 32 is originally set to correspond with the minute hand of the clock, while the dial disk 41 is set to correspond with the hour hand.

For the sake of illustrating the operation of the indicator as clearly as possible, we have shown the same with the dials in the position occupied one second before two, the tooth 35 of the second disk being just on the point of turning the minute disk, while the tooth of the minute disk is about to turn the hour disk, the next reading of course being two hours and no minutes and seconds.

In Figs. 3 and 4, we have illustrated a slightly modified form of indicating mechanism adapted for indicating the hours and minutes only. In this instance, the minute disk 50 is mounted upon the shaft 51 in the usual manner and is provided with a plurality of spaced apart, concentrically arranged pins 52 forming a crown gear, the teeth of which are engaged by the hooked terminal 53 of the arm 54 pivoted to the armature 55 of the electro-magnet 56. The shaft 51 in this instance is preferably journaled between the front and rear walls of an inner casing 57, the sides of which are maintained in proper spaced relation by pivot pins 58 and 59, the former of which carries a pawl 60 for engagement with the teeth 52 of the crown gear. The hour disk in this latter instance is done away with, the numerals being applied directly upon the ratchet gear 61 which is formed with a hub 62 supported between set screws 63 threaded through the opposite sides of the casing 57 and engaging in conical bores formed in the ends of the hub. This gear is actuated by a tooth 64 formed upon the peripheral edge of the minute dial 50 adjacent the numeral 59 and is held against counter-rotation by a pawl 65 pivoted upon the pivot pin 59. The operation of this modified form is identical with that of the preferred form with the exception that the electro-magnet is, of course, energized but once each minute.

From the foregoing description, it will be apparent that we have provided an extremely simple and effective form of electrically actuated time indicator, and that any number of these indicators may be actuated or governed by a single clock positioned at any distance from the indicators.

Having thus described the invention, what is claimed as new is:

An electric time indicator including an electromagnet, a plurality of U-shaped brackets, shafts extending between the arms of each of said brackets and at points intermediate the length thereof, a plurality of dial disks mounted upon the said shafts, means operable by the magnet for intermittently rotating one of the said disks, means operable by the movement of said disk for intermittently rotating the second disk, and means for holding each of said disks against counter-rotation, said last-mentioned means consisting of a pawl pivoted to the arm of each of said bracket members above the shaft thereof and engageable with the disk of the said shaft.

In testimony whereof we affix our signatures in presence of two witnesses.

WILLIAM M. JEFFREYS. [L. S.]
WILLIAM H. CREAHEN. [L. S.]

Witnesses:
H. A. ERNST,
H. W. SITTIG.